(12) United States Patent
Ma et al.

(10) Patent No.: US 10,545,288 B2
(45) Date of Patent: Jan. 28, 2020

(54) INTEGRATED ON-CHIP POLARIZER

(71) Applicant: Elenion Technologies, LLC, New York, NY (US)

(72) Inventors: Yangjin Ma, Brooklyn, NY (US); Michael J. Hochberg, New York, NY (US); Ruizhi Shi, New York, NY (US); Yang Liu, Elmhurst, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 16/247,819

(22) Filed: Jan. 15, 2019

(65) Prior Publication Data
US 2019/0170940 A1 Jun. 6, 2019

Related U.S. Application Data

(63) Continuation of application No. 15/659,049, filed on Jul. 25, 2017, now Pat. No. 10,215,920, which is a
(Continued)

(51) Int. Cl.
*G02B 6/12* (2006.01)
*G02B 6/126* (2006.01)
(Continued)

(52) U.S. Cl.
CPC .............. *G02B 6/126* (2013.01); *G02B 6/122* (2013.01); *G02B 6/125* (2013.01); *G02B 6/1228* (2013.01);
(Continued)

(58) Field of Classification Search
CPC ...... G02B 6/126; G02B 6/1228; G02B 6/125; G02B 6/122; G02B 6/14;
(Continued)

(56) References Cited

U.S. PATENT DOCUMENTS 5,949,943 A 9/1999 Watanabe et al.
6,178,276 B1 * 1/2001 Mackie .................. H01S 3/063
359/341.3
(Continued)

OTHER PUBLICATIONS

Daoxin Dai et al., "Passive technologies for future large-scale photonic integrated circuits on silicon: polarization handling, light non-reciprocity ad loss reduction", Light: Science & Applications, vol. 1, No. 3, Mar. 29, 2012, p. e1, XP055256769, COI: 10.1038/isa.2012.1.
(Continued)

*Primary Examiner* — Jerry M Blevins
(74) *Attorney, Agent, or Firm* — Stratford Managers Corporation (57) ABSTRACT

A low loss high extinction ratio on-chip polarizer is disclosed. The polarizer is formed of a mode convertor followed by a mode squeezer and a dump waveguide, and may be configured to pass a desired waveguide mode and reject undesired modes. An embodiment is described that transmits a TE0 mode while blocking a TM0 mode by converting it into a higher-order TEn mode in a waveguide taper, squeezing out the TEn mode in a second waveguide taper to lessen its confinement, and then dumping the TEn mode in a waveguide bend that is configured to pass the TE0 mode.

20 Claims, 7 Drawing Sheets

Related U.S. Application Data continuation of application No. 14/944,562, filed on Nov. 18, 2015, now Pat. No. 9,746,609, which is a continuation-in-part of application No. 14/788,608, filed on Jun. 30, 2015, now Pat. No. 9,470,844.

(51) Int. Cl.
  *G02B 6/122* (2006.01)
  *G02B 6/14* (2006.01)
  *G02B 6/125* (2006.01)

(52) U.S. Cl.
  CPC ...... *G02B 6/14* (2013.01); *G02B 2006/12061* (2013.01); *G02B 2006/12078* (2013.01); *G02B 2006/12097* (2013.01); *G02B 2006/12116* (2013.01)

(58) Field of Classification Search
  CPC ........... G02B 2006/12061; G02B 2006/12078; G02B 2006/12097; G02B 2006/12116
  USPC ........................................... 385/11; 29/592.1
  See application file for complete search history.

(56) References Cited

U.S. PATENT DOCUMENTS

| | | | |
|---|---|---|---|
| 9,323,079 B1* | 4/2016 | Feng | G02F 1/025 |
| 2009/0324163 A1* | 12/2009 | Dougherty | B82Y 20/00 |
| | | | 385/14 |
| 2010/0158443 A1* | 6/2010 | Jeong | G02B 6/1228 |
| | | | 385/50 |
| 2011/0163610 A1* | 7/2011 | Gilbert | H01Q 3/26 |
| | | | 307/104 |
| 2015/0003782 A1* | 1/2015 | Oka | G02B 6/2804 |
| | | | 385/42 |
| 2015/0010266 A1* | 1/2015 | Webster | G02B 6/122 |
| | | | 385/14 |
| 2015/0277042 A1 | 10/2015 | Goodwill et al. | |
| 2017/0023808 A1* | 1/2017 | Tu | G02F 1/0136 |
| 2017/0176677 A1* | 6/2017 | Oka | G02B 6/125 |

OTHER PUBLICATIONS

Examination report from corresponding EP Application No. 16738625.9.

* cited by examiner

INTEGRATED ON-CHIP POLARIZER

CROSS REFERENCE TO RELATED APPLICATIONS

This application is a continuation of U.S. patent application Ser. No. 15/659,049, filed Jul. 25, 2017, now allowed, which is a continuation of U.S. patent application Ser. No. 14/944,562, filed Nov. 18, 2015, now U.S. Pat. No. 9,746,609, which is a continuation-in-part of and claims priority to U.S. patent application Ser. No. 14/788,608, filed Jun. 30, 2015 now U.S. Pat. No. 9,470,844 each of which is hereby incorporated by reference herein in its entirety.

FIELD OF THE INVENTION

The invention relates to optical waveguides in general and particularly to an integrated optical waveguide polarizer and/or mode filter for photonic integrated circuits and related methods.

BACKGROUND OF THE INVENTION

High-speed optical transmission requires high standard coupling between fibers and photonic integrated circuits (PICs). However most photonic integrated circuits operate at a specific polarization state, usually polarization of the fundamental mode. This is different from the situation in single mode fiber where radial symmetry guarantees the equivalence of different polarization orientations.

Inside a PIC, higher order modes may be excited as a consequence of imperfections such as side wall roughness, and as a consequence of reflections, transitions between multimode and single mode regions, and other interactions of the optical signal with the mechanical structure of the PIC.

Generally, integrated waveguides have two orthogonal transverse polarization states, TE and TM, each of which has a lowest order mode, conventionally denoted TE0 and TM0, respectively. The TE0 and TM0 mode may also be referred as fundamental TE and TM modes, respectfully. Between TE0 and TM0 modes, the mode that has a lower mode number (i.e., the largest effective refractive index) may be referred to as the fundamental mode of the waveguide.

Higher order TE and TM modes may generally be suppressed by tapering down the waveguide to a single mode region, as they become leaky modes. However, it may be more difficult to get rid of the TM0 mode as its effective index in the waveguide may be close to that of the TE0 mode.

Several techniques to eliminate a TM0 mode have been suggested. One approach is to use a directional coupler to couple TM0 mode out of the waveguide. However this method is wavelength sensitive.

Another approach is to place metal atop of the waveguide to absorb the TM0 mode. However, this approach may not be compatible with standard CMOS-compatible processes and additionally may introduce an undesired extra loss for the TE0 mode.

There is a need for systems and methods that maintain optical signals propagating in photonic integrated circuits in well-defined polarization states and/or specific modes.

SUMMARY

According to one aspect, the present disclosure relates to an integrated on-chip optical polarizer, comprising: a mode converting waveguide disposed to receive light comprising a first mode and a second mode and configured to selectively convert the second mode into a third mode while preserving the first mode; a mode squeezing waveguide disposed to receive light from the mode converting waveguide and configured to lessen an optical confinement of the third mode to a greater degree than that of the first mode; and, a dump waveguide disposed to receive light from the mode squeezing waveguide and configured to dump the third mode while allowing light in the first mode to propagate to an output.

The mode converting waveguide may comprise a first waveguide taper that widens in a direction of light propagation. The mode squeezing waveguide may comprise a second waveguide taper that narrows in the direction of light propagation. The dump waveguide may comprise a waveguide bend that is characterized by a bend radius selected to dump the third mode by leaking while allowing the first mode to propagate along the dump waveguide towards the output end thereof.

An aspect of the present disclosure provides a photonic integrated circuit (PIC) comprising the integrated on-chip waveguide polarizer and an integrated optical device in optical communication with said polarizer, the integrated optical device selected from a list comprising a photodetector, an optical modulator, an Echelle grating, an MIMI coupler, a routing waveguide, a polarization beam splitter/combiner, and an integrated laser source.

An aspect of the present disclosure provides a PIC chip comprising: an optical waveguide interconnect disposed to provide an optical connection between a first optical device and a second optical device and comprising one or more integrated on-chip polarizers of claim 1, each configured to suppress light propagating in the optical waveguide interconnect in the second mode while passing through light in the first mode, so as to reduce mode crosstalk downstream from the one or more integrated on-chip polarizers.

An aspect of the present disclosure provides a PIC comprising: an optical waveguide interconnect configured to provide an optical connection between a first optical device and a second optical device, and comprising one or more integrated waveguide polarizers, each configured to suppress light propagating in the optical waveguide interconnect in an undersized polarization or mode, so as to reduce polarization and/or mode crosstalk downstream from the one or more integrated waveguide polarizers.

An aspect of the present disclosure provides a method of polarization and/or mode filtering, in a PIC chip comprising an optical waveguide supporting first and second modes. The method may comprise: a) receiving light comprising first and second modes into a mode converting waveguide; b) using the mode converting waveguide to selectively convert light received in the second mode into a third mode while maintaining light received in the first mode to remain in the first mode; c) using a mode squeezing waveguide to at least partially squeeze out the third mode so as to lessen an optical confinement thereof within the mode squeezing waveguide to a greater degree than the optical confinement of the first mode; and, d) selectively attenuating the third mode using a dump waveguide configured to dump light of the third mode received from the mode squeezing waveguide while allowing light in the first mode to propagate to an output. In one embodiment the first mode may be a mode of a first polarization, such as for example a TE mode, while the second mode may be a mode of a second polarization that is different from the first polarization, such as for example a TM mode, and the method may be used for polarization filtering and suppressing depolarization of light in a PIC.

An aspect of the present disclosure provides a method of designing a photonic integrated circuit (PIC) chip, the method comprising: a) determining a routing path in the PIC chip for an optical waveguide interconnect that is configured for routing optical signals between optical elements; and, b) disposing one or more waveguide polarizers along the routing path so that a maximum length of a contiguous section of the optical waveguide interconnect without a waveguide polarizer does not exceed a predefined maximum length.

The method may further include determining said maximum length in dependence upon one or more waveguide parameters. Steps a) and b) may be performed automatically by a computer executing software instructions for implementing said steps.

BRIEF DESCRIPTION OF THE DRAWINGS

Embodiments disclosed herein will be described in greater detail with reference to the accompanying drawings, which may be not to scale and in which like elements are indicated with like reference numerals, and wherein.

DETAILED DESCRIPTION

In the following description, for purposes of explanation and not limitation, specific details are set forth, such as particular optical circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Furthermore, the following abbreviations and acronyms may be used in the present document:
CMOS Complementary Metal-Oxide-Semiconductor
GaAs Gallium Arsenide
InP Indium Phosphide
$LiNO_3$ Lithium Niobate
MFD Mode Field Diameter
MPW Multi Project Wafer
PIC Photonic Integrated Circuits
PSO Particle Swarm Optimization
SOI Silicon on Insulator
TE Transverse Electrical
TM Transverse Magnetic Note that as used herein, the terms "first", "second" and so forth are not intended to imply sequential ordering, but rather are intended to distinguish one element from another, unless explicitly stated. Similarly, sequential ordering of method steps does not imply a sequential order of their execution, unless explicitly stated. The word 'using', when used in a description of a method or process performed by an optical device such as a polarizer or a waveguide, is to be understood as referring to an action that may be performed in operation by the optical device itself or by a component thereof rather than by an external agent. The term 'TE mode' refers to a waveguide mode with the direction of the electric field vector transverse, i.e. orthogonal, to the direction of light propagation. The term 'TM mode' refers to a waveguide mode with the direction of the magnetic field vector transverse, i.e. orthogonal, to the direction of light propagation. In a planar waveguide, the electric field of a TE mode may lie primarily in the plane of the waveguide, i.e. in the plane of a chip supporting the waveguide, while the electric field of a TM mode may light primarily in a plane normal to the plane of the waveguide, or normal to the plane of a chip supporting the waveguide. Accordingly, TE and TM modes may also be referred to as polarization modes, or as modes of a first polarization and second polarization, wherein the term 'first polarization' may refer to either one of the TE and TM polarizations, with the term 'the second polarization" referring then to the other one of the TE and TM polarizations. TE and TM modes of an n-th order are denoted as TEn and TMn, respectively, with n=0 designating a fundamental mode, so that notations TE0 and TM0 designate fundamental TE and TM modes, respectively. The term 'higher-order mode' may refer to any non-fundamental TEn or TMn mode of the order n=1, 2, 3, . . . greater than zero, unless explicitly stated otherwise. An optical device that suppresses light of a selected mode or group of modes to a greater degree than light of another mode or group of modes may be referred to herein as a mode filter or mode throttler. An optical device that suppresses light of one polarization, for example TM or TE, to a greater degree than light of an orthogonal polarization, for example TE or TM, is referred to herein as an optical polarizer. It will be appreciated that a waveguide polarizer may also be referred to as a mode filter.

One aspect of the present disclosure relates to mode filters or polarizers that strip incoming optical signal from substantially all modes that may be present therein except for one desired mode, and let the desired mode to propagate further along an optical path substantially unaffected. Some embodiments may relate to mode filters or polarizers that strip incoming optical signal from one or more undesired modes that may be present therein, and let the desired mode to propagate further along an optical path substantially unaffected. The desired mode may be for example a fundamental TE or TM mode, but may also be a higher order TE or TM mode. Such devices are useful in many applications where a good optical beam quality is of importance. Integrated polarizers or mode filters that may be incorporated on a chip may be particularly useful in optical integrated circuits (PIC) as means to eliminate or suppresses noise due to mode crosstalk and/or polarization crosstalk that can be generated as an optical signal passes through a conventional PIC. An integrated on-chip polarizer incorporated in a PIC enables to decrease polarization crosstalk in the PIC and increase signal to noise ratio for optical signals in the PIC.

One aspect of the present disclosure provides an integrated optical polarizer that is formed of a mode converting waveguide, a mode squeezing waveguide, and a dump waveguide connected in series. The mode converting waveguide may be disposed to receive light of a first mode and a second mode, and may be configured to selectively convert the second mode into a third mode while maintaining the first mode substantially undisturbed. The mode squeezing waveguide optically follows the mode converting waveguide and is configured to weaken an optical confinement of the third mode to a greater degree than that of the first polarization mode. The dump waveguide may be configured to dump the third mode while preserving the first mode. The first mode may be, for example the TE0 mode, while the second mode may be a TM0 mode or a higher-order TM mode; the third mode may be a TE1 mode or another higher order TEn mode. The wordings 'configured to dump', 'configured for dumping', and the like, when used with reference to a mode in a waveguide, are understood herein to refer to a waveguide that is configured so as to prevent light that enters the waveguide in the mode of reference from reaching an output end of the waveguide, such as by becoming de-coupled from the waveguide or due to selective absorption. The wording 'configured to selectively dump a mode" and the like is used herein to refer to a waveguide that 'dumps' an undesired mode or modes, for example by leaking into radiative modes or by absorption, while allowing a desired mode to propagate along the waveguide to its output end substantially unimpeded.

One or more example embodiments described herein relate to an integrated polarizer with ultra-low loss for light of a desired polarization mode, for example on the order of 0.1-0.05 dB or less, and high polarization extinction ratio (ER), for example on the order of 20 dB or greater, and a related method, which may be advantageously used in a PIC where eliminating a TM0 mode while avoiding a loss to a TE0 mode is desired. In these embodiments, the integrated polarizer converts the unwanted TM0 mode into a higher order mode or modes, which are then selectively eliminated, for example dumped away from the optical path. At the same time, the desired mode, such as the fundamental TE0 mode, is substantially preserved across the integrated polarizer. In one embodiment of the integrated on-chip polarizer, a TM0 mode introduced at an input end of the polarizer is converted to a TE1 mode which is then forced to leak out of a leaky bent optical waveguide, while the TE0 mode is preserved and is delivered to an output end of the polarizer substantially without loss or with only a minimal loss in power.

Figure 1:
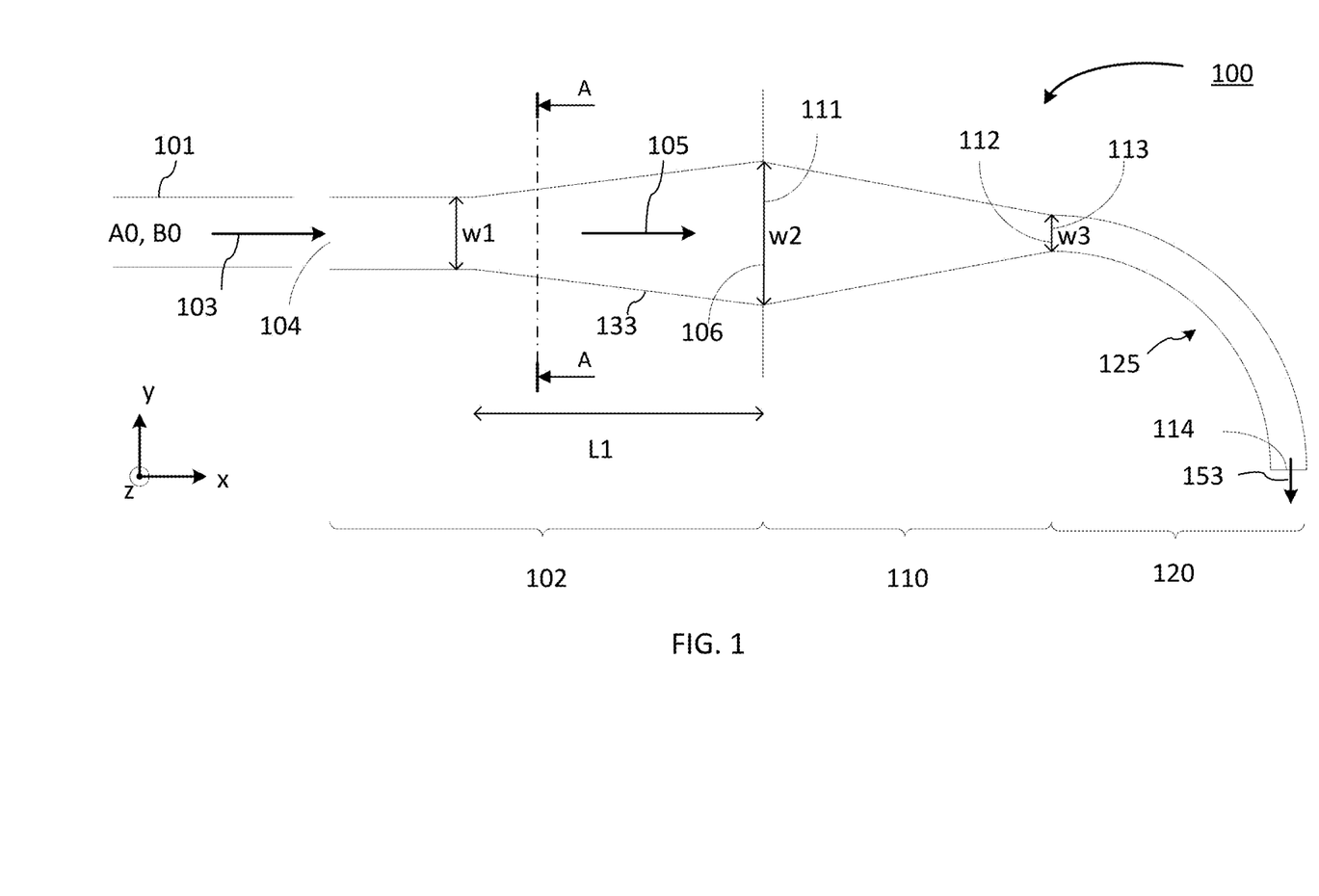
FIG. 1 is a schematic plan-view diagram of an embodiment of a waveguide polarizer using a mode converter, a mode squeezer, and a dump waveguide to eliminate an undesired mode or modes.

Referring now to FIG. 1, there is illustrated a schematic plan view of an example integrated optical polarizer 100, which is suitable for implementing in a PIC on a chip, and which may also be referred to herein as the waveguide polarizer 100, on-chip polarizer 100, or simply as polarizer 100. In the illustrated embodiment, the integrated optical polarizer 100 is formed of a mode converting waveguide 102 that is optically followed by a mode squeezing waveguide 110, which is in turn optically followed by a dump waveguide 120, all three connected optically in series so that input light 103 is sequentially passed through them. The mode converting waveguide 102 may also be referred to herein as the mode converter 102, and the mode squeezing waveguide 110—as the mode squeezer 102. The mode converting waveguide 102 has an input end 104, where it has a width W1, and an output end 106 where it has a width W2. The input end 104 of the mode converting waveguide 102 may also be viewed as the input end of polarizer 100. In embodiments wherein the mode converting waveguide 102 is bi-level, such as for example a rib waveguide taper as described hereinbelow more in detail with reference to an example embodiment, W1 and W2 may refer to the width of the waveguide 102 at one level thereof, for example the width of the central ridge core of the waveguide.

The mode converting waveguide 102 may be disposed on a PIC chip as a part of the PIC. In operation it may receive in its input end 104 light 103 that may include two waveguide modes, a first mode which will be denoted herein as B0 and a second mode which will be denoted herein as A0. Modes A0 and B0 may be, for example, waveguide modes of an input waveguide 101 coupled to the input end 104 of the polarizer, and may also correspond to waveguide modes of the mode converting waveguide 102 at the input end 104 thereof. The example integrated optical polarizer 100 may be configured to pass the first mode B0 therethrough substantially without loss, while substantially blocking the second mode A0; accordingly, the first mode B0 may be referred to as the desired mode, while the second and third modes A0, A1—as the undesired modes. In one embodiment, the first mode B0 may be a fundamental TE or TM mode, while the second mode A0 may be a higher-order mode having a lower effective index than the first mode B0. In one embodiment, the first mode B0 may be a fundamental TM mode, while the second mode A0 may be a fundamental TE mode, i.e. TE0, or a higher-order TM or TE mode. In one embodiment, the first mode B0 may be a fundamental TE mode, i.e. TE0, while the second mode A0 may be a fundamental TM mode, i.e. TM0, or a higher-order TM or TE mode. In a representative embodiment, the first mode B0 may be the TE0 mode, the second mode A0 may be the TM0 mode.

The received light 103 then propagates in the mode converting waveguide 102 in the direction indicated by arrow 105 towards the mode squeezer 110, so that light from the output end 106 of the mode converting waveguide 102 is received into an input end 111 of the mode squeezer 110, either directly or through an optional transitional optical element (not shown). The damp waveguide 120 has an input end 113 that connects, either directly or through an optional transitional optical element (not shown), to the output end 112 of the mode squeezer 110, and an output end 114 that may function as the output end or port of the polarizer 100.

As illustrated in FIG. 1, the mode converting waveguide 102, the mode squeezer 110, and the dump waveguide 120 of the polarizer 100 may be directly connected optically in series to form a continuous multi-section waveguide which shape and/or other structural characteristics vary along its length so as to guide light of a desired polarization or mode from the input end 104 to the output end 114, while disposing of light received in an undesired polarization or mode. Such a multi-section waveguide polarizer 100 may be formed upon a support substrate or wafer, for example in a semiconductor or dielectric layer of a semiconductor wafer, including but not limited to in a silicon layer of a SOI chip. Embodiments wherein only one or two of the waveguides 102, 110 and 120 is disposed in or upon a same support substrate such as a semiconductor wafer may also be envisioned.

The mode converting waveguide 102 may be configured to selectively convert the second mode A0 into a third mode A1, while preserving the first mode B0 along the waveguide, so that substantially all light that enters the mode converting waveguide 102 through its input end 104 as mode B0, reaches its output end 106 as a mode of substantially same polarization and mode order, i.e. generally maintaining the polarization state and the number of nodes in the field profile that are characteristic of mode B0. In a representative embodiment the second mode A0 may, for example, be a TM0 mode while the first mode B0 may be a TE0 mode. The first mode B0 may have a greater effective refractive index than the second mode A0 at the input 104 of the mode converting waveguide 102 and along the length thereof. The third mode A1 may be a waveguide mode that has a lower effective refractive index $n_{eff}$ than the first mode B0 at the output end 106, or preferably a lower effective index than both the first mode B0 and the second mode A0 at an output 112 of the mode squeezer 110.

To effect the desired mode conversion A0→A1, one or more waveguiding parameters or characteristics of the mode converting waveguide 102 may vary in the direction of light propagation 105 in a way that makes the effective refractive indices of the second and third modes A0 and A1, which may differ at the input end 104, become nearly equal at a location within the waveguide 102 along the direction of light propagation, so that light 103 that enters the polarizer 100 in mode A0 may effectively couple into mode A1 and enter the mode squeezing waveguide 110 as the third mode A1.

The mode squeezing waveguide 110 may then be configured so that its waveguiding property become progressively weaker in the direction of light propagation from its input end 111 to its output end 112, so as to lessen an optical condiment of the lower-index third mode A1 within the waveguide, and hence its effective index, to a significantly greater degree than that of the first and second modes. Here, the term 'optical confinement', when used with reference to a mode of a waveguide, refers to a fraction of the mode's power confined within the waveguide core. In effect, the mode squeezing waveguide 110 acts to squeeze the lower-effective index third mode A1 out of the waveguide to a greater degree than the higher-effective index first mode B0. The dump waveguide 120 may be configured, for example shaped, to lose the weaker coupled third mode A1 to radiation modes but guide the first mode B0 to its output end 114 substantially without leaking.

In one embodiment the mode converting waveguide 102 may be implemented as a waveguide taper that widens in the direction 105 of light propagation, so that its input width W1 is smaller than its output width W2. The waveguide taper embodying the mode converting waveguide 102 will also be referred to herein as the first waveguide taper 102. Note that although the widening is shown to be linear or piece-wise linear in FIG. 1, it is by example only and in other embodiments the widening may be non-linear with length, i.e. along the 'x' coordinate of a Cartesian coordinate system (x,y,z) indicated in FIG. 1, and the first waveguide taper 102 may be a multi-segmented and/or smooth taper which exact shape in the plane (x,y) of the PIC chip may be determined by optimization. Such a taper may be designed so that for example a TM mode, e.g. TM0, becomes coupled to, or hybridized with, a higher-order TE mode such as for example TE1 or TE3, at a location along the first waveguide taper 102 wherein the waveguide taper 102 has a particular waveguide width Wx, resulting in the A0→A1 mode conversion, where A0 corresponds to the TM mode such as TM0, and A1—to the higher-order TE mode. Thus, such a waveguide taper may be configured to pass the TE0 mode therethrough while converting the TM0 mode into a higher-order TE mode. The TM-TE mode conversion of this type may be effected, for example, in a planar waveguide taper that is "vertically asymmetric", i.e. is asymmetric in the direction normal to the surface of the PIC wafer or layer upon which the mode converting waveguide 102 is formed, i.e. in the direction along the z-axis that is normal the (x,y) plane of FIG. 1. In the context of this specification we will be referring to any plane that is parallel to the surface of the PIC chip or wafer at the location of a waveguide in question as the plane of the waveguide or the horizontal plane, and a direction that is perpendicular thereto as the vertical direction or the normal direction. The terms "vertically asymmetric waveguide" and "waveguide that is asymmetric in the vertical direction" means a waveguide for which there is no horizontal plane with respect to which the waveguide and its modes would have a top-bottom or "over-under" symmetry.

Figure 2:
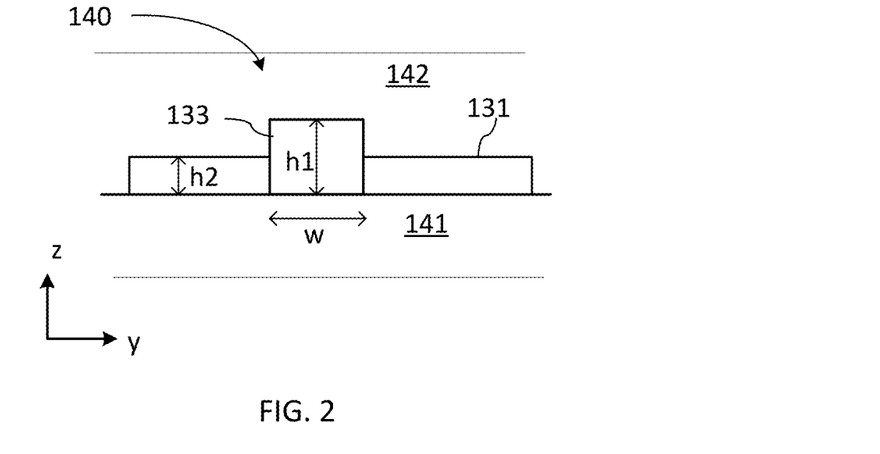
FIG. 2 is a schematic diagram showing a partial cross-section of the waveguide polarizer of FIG. 1 along the A-A line for an embodiment incorporating a bi-level rib waveguide taper.
Figure 3:
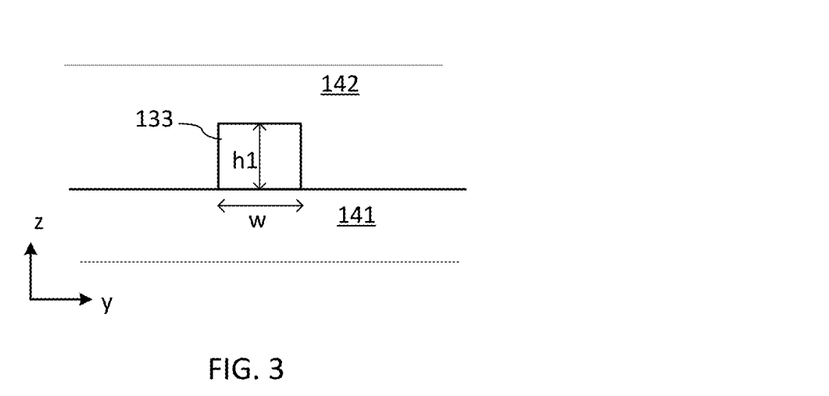
FIG. 3 is a schematic diagram showing a partial cross-section of the waveguide polarizer of FIG. 1 along the A-A line for an embodiment for an embodiment incorporating a single-level ridge waveguide taper.

Referring now also to FIG. 2 while continuing to refer to FIG. 1, in one embodiment the mode converting waveguide 102 may be embodied as a vertically-asymmetric bi-level rib waveguide taper 140 wherein a core waveguiding region 133 in the form of a ridge or rib of height h1 is flanked on one or both sides by a slab waveguide of height h2<h1 defining an outer waveguiding region or regions 131. FIG. 2 schematically illustrates a cross-section of the bi-level rib waveguide taper taken along the line A-A in FIG. 1. One or both of the mode squeezing waveguide 110 and the dump waveguide 120 may also be in the form of a bi-level rib waveguide having a cross-section generally as illustrated in FIG. 2, or may be in the form of a single-level ridge waveguide having a cross-section generally as illustrated in FIG. 3. The rib waveguide taper 140 of the mode converter 102 may be formed, for example, by selectively etching to a desired depth d=(h1−h2) a semiconductor or dielectric layer that is disposed over a base layer 141, which has a lower index of refraction than the material of the rib waveguide 133/131 and serves as a lower cladding layer of the waveguide. The rib waveguide taper 140 may also be formed by a two-step selective deposition process of same or different materials that form top and bottom layers of different width. In one embodiment, a top cladding layer 142 may be deposited over the rib waveguide 140. In another embodiment, top layer 142 may be absent, with the upper cladding provided by air or another gas. In one embodiment the layer in which the core and outer waveguiding regions 133, 131 of the rib waveguide 140 is formed may be a silicon layer of a silicon-on-insulator (SOI) chip, and the base layer 141 may be a layer of silicon dioxide (SiO2). The top cladding layer 142, when present, may be for example a layer of silicon dioxide, silicon nitride (Si3N4), polymer, or of any other suitable non-conducting material of a lower index of refraction than that of the waveguiding regions 133, 131. It will be appreciated that other material systems may also be used to form the mode converting waveguide 102 and/or the other waveguide sections 110, 120 of polarizer 100.

Particular value of the waveguide width Wx at which second and third waveguide modes become hybridized in such a waveguide depends on the waveguide' parameters such as the rib waveguide heights h1 and h2 and the refractive indices of the upper and lower claddings and of the ridge 133, and may be determined by computer modeling and/or experimentally. By way of example, a silicon rib waveguide taper 140 with the slab waveguide height h2=0.15-0.25 μm of sufficient width and SiO2 cladding, Wx may be about 0.9-1.1 μm for the TM0→TE1 conversion, and about 2.2-2.5 μm for a TM0→TE3 conversion.

With reference to FIG. 3, in one embodiment the slab waveguiding region 131 at the sides of the ridge waveguiding core 133 may be absent, and the mode converting waveguide 102 may be substantially a single-level waveguide taper formed of the ridge 133 that is disposed over the base layer 141 and surrounded on remaining sides by the cladding 142 or air, with the ridge width W gradually increasing over the length of the taper from W1<Wx at the input end to W2>Wx at the output end. The ridge 133 may also be referred to as the waveguide core, with the 'waveguide' in that context understood to refer to the core 133 in combination with the claddings 141, 142. When the refractive index of the base layer 141 differs from the refractive index of the upper cladding 142, the waveguide of FIG. 3 is asymmetric in the vertical direction, i.e. in the direction normal to the plane of the waveguide as illustrated by the z-axis in FIGS. 2-4, so that certain TM and TE modes may become hybridized at a certain waveguide width Wx, resulting in a mode conversion such as TM0→TEn as the waveguide width increases past Wx.

Figure 4:
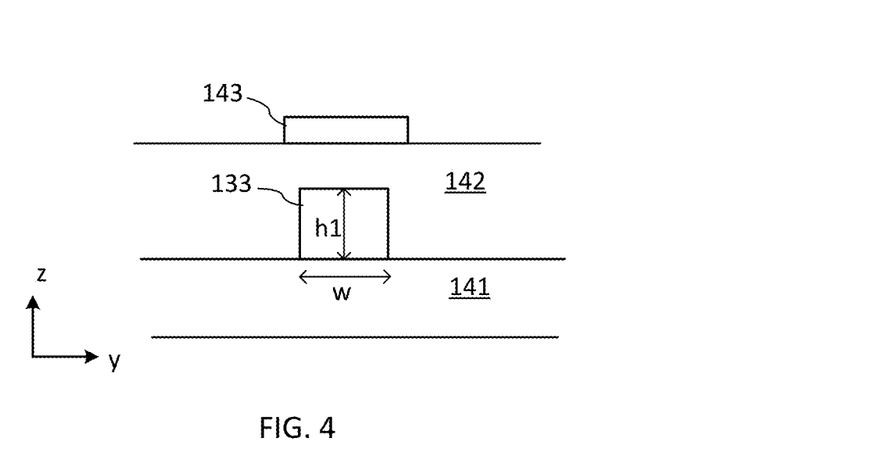
FIG. 4 is a schematic diagram showing a partial cross-section of the waveguide polarizer of FIG. 1 along the A-A line for an embodiment for an embodiment incorporating a single-level ridge waveguide taper and a higher-level layer.

With reference to FIG. 4, in one embodiment a higher-level layer 143 of a dielectric or semiconductor material may be disposed over the cladding layer 142, which may add to the asymmetry of the waveguide 133 and its modes even in embodiments wherein the lower and upper claddings 141, 142 are of the same refractive index, for example both are of SiO2. Particular value of the waveguide width Wx depends on the waveguide' parameters such as the waveguide height h1 and the refractive indices of the upper and lower claddings and of the ridge 133, and may be determined by computer modeling and/or experimentally. By choosing W1<Wx<W2 and a suitable taper length L1, light that enters the input end 104 of the first waveguide taper 102 in the second mode A0, such as the TM0 mode, may be efficiently converted at the output end 106 of the taper 102 to the third mode A1, for example a higher order TE mode such as TE1 or TE3.

Preferably, the mode squeezing waveguide 110 is configured so as to prevent the reverse mode conversion A1→A0; this may include, for example, configuring the mode squeezing waveguide 110 to be less vertically-asymmetric than the mode converting waveguide 102, for example by implementing it in the form of a single-level planar waveguide such as the ridge waveguide of FIG. 3, so that the hybridization of the second and third modes A0, A1 does not happen anywhere in the mode squeezing waveguide 110.

Figure 5:
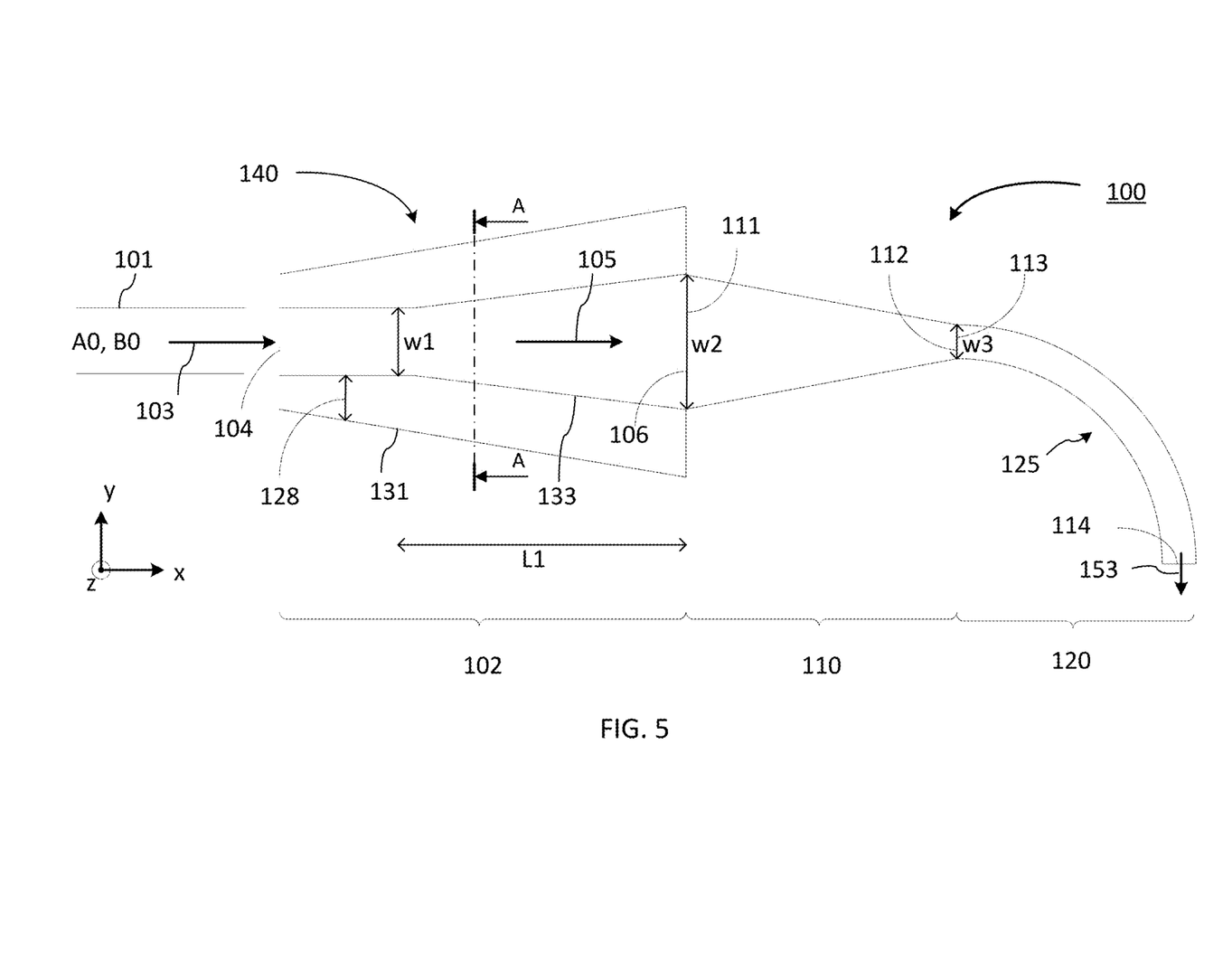
FIG. 5 is a schematic plan-view diagram of an embodiment of the polarizer of FIG. 1 with a bi-level waveguide taper for TM0-TEn mode conversion.

With reference to FIG. 5, there is illustrated an example embodiment of the polarizer 100 wherein the mode converting waveguide 102 is formed with the bi-level waveguide taper 140 having a cross-section as generally illustrated in FIG. 2, while the mode squeezing waveguide 110 and the dump waveguide 120 are both single-level ridge waveguides with cross-sections generally as illustrated in FIG. 3. The core ridge 133 of the waveguide taper 140 widens from the input width W1 at the input end 104 of the bi-level taper to the output width W2 at the output end thereof. Note that although the widening is shown to be linear or piece-wise linear in FIG. 5, it is by example only and in other embodiments the widening of the ridge 133 may be non-linear, the bi-level taper 140 may be a multi-segmented and/or smooth taper, which exact shape in the plane of the PIC chip may be determined by optimization. It may be preferable that the bi-level taper 140 is adiabatic so that the change of its width from the input width W1 to the output width W2 happens smoothly over a length L1 that is sufficient to prevent back reflections and to provide a complete or near-complete TM0→TE1 or TE3 conversion for the input light 103. The width 128 of the slab waveguide 131 in the (x,y) plane of FIG. 5, i.e. the plane of the waveguide, may also be increasing in the direction of light propagation 105, either linearly or non-linearly, or may stay approximately constant along the waveguide in some embodiments. In one embodiment the width 128 of the outer waveguiding regions 131 may taper off to zero at the input end 104. It may also taper off gradually to zero within the mode squeezer 110.

Referring to both FIG. 1 and FIG. 5, the mode squeezer 110 may be in the form of a second waveguide taper which is disposed with its input end 111 positioned to receive light from the output end 106 of the mode converting waveguide 102. At its input end 111 the mode squeezer 110 may match the mode converting waveguide 102 in size in order to minimize back reflections, but narrows in the direction of the light propagation to a width W3 that is smaller than W2. The second waveguide taper 110 may be a single-level ridge waveguide of the type illustrated in FIG. 3 in cross-section. It may also be bi-level or include a bi-level section, for example at the input end 111 wherein the lower-level slab waveguide 131 may taper down in width to provide an adiabatic waveguide transition between the bi-level first waveguide taper of the mode converting waveguide 102 and the single-level waveguide taper of the mode squeezing waveguide 110. Note that although the narrowing of the waveguide 110 is shown in FIG. 1 to be linear in the direction of light propagation, it is by example only and in other embodiments the narrowing of the mode squeezing waveguide 110 may be non-linear with the distance along the direction of light, and the second taper may be a multi-segmented and/or smooth taper, which exact shape in the plane of the chip may be determined by optimization. It may be preferable that the second taper 110 is adiabatic so that the change of its width from the input width W2 to the output width W3 happens gradually over a length that is sufficient to prevent back reflections. As light of the third mode A1, for example TE1, that is received from the mode converting waveguide 102 travels down the narrower end 112 of the second waveguide taper 110, it becomes progressively less confined within the waveguide, with an increasing fraction of its power squeezed out of the waveguide and into the cladding or air at the sides thereof, so that it enters the dump waveguide 120 substantially less confined than the lower-order first mode, for example TE0, which has a greater effective index. Although the output width W3 of the mode squeezing waveguide 110 is shown to be smaller than the input width W1 of the mode converting waveguide of the polarizer, in other embodiments W3 may be equal to W1 or it can be greater than W1.

Continuing to refer to both FIG. 1 and FIG. 5, the dump waveguide 120 may be in the form of a ridge or rib waveguide that is coupled to the output end 112 of the mode squeezing waveguide 110, for example it may adiabatically continue from the output end 112 of the mode squeezing waveguide 110, matching its output end 112 in width. Accordingly, in one embodiment the dump waveguide 120 may have a width equal to the output width W3 of the mode squeezer waveguide 110. The dump waveguide 120 may further be in the form, or include, a waveguide bend 125 of a radius $R_{bend}$ that is sufficiently small so that the lower-index, less confined third mode A1, such as TE1 or TE3, loses its coupling with the waveguide at a wavelength of operation $\lambda$ and is effectively dumped from the waveguide over the length of the bend, while the higher-index, higher-confinement first mode B0, e.g. TE0, of the same wavelength $\lambda$ remains coupled and is guided by the dump waveguide to its output end 114 substantially without leaking, so that the output light 153 from the polarizer contains substantially only, or predominantly, the TE0 mode. In another embodiment, the dump waveguide 120 may be in the form of, or may include, any structure which absorbs, scatters, or otherwise couples out the less-confined third mode A1 but preserves B0. Note that in embodiments wherein the first mode B0 is the highest effective index mode of the input waveguide, which is typically but not exclusively the TE0 mode, and the second mode A0 is a mode having a second highest effective, which is typically the TM0 mode, that is converted in the mode converting waveguide 102 into a mode having a third highest effective index, such as the TE1 mode, that is subsequently dumped by the dump waveguide 120, the integrated waveguide polarizer 100 described hereinabove operates substantially as a mode filter that blocks all modes other than the highest-index first mode B0, since the dump waveguide 120 that is configured to eliminate TE1 mode will also eliminate all higher-order TE and TM modes that may pass the mode converting and mode squeezing waveguides 102, 120, as the higher-order modes typically have lower effective index and are less confined within the waveguide core.

Figure 6:
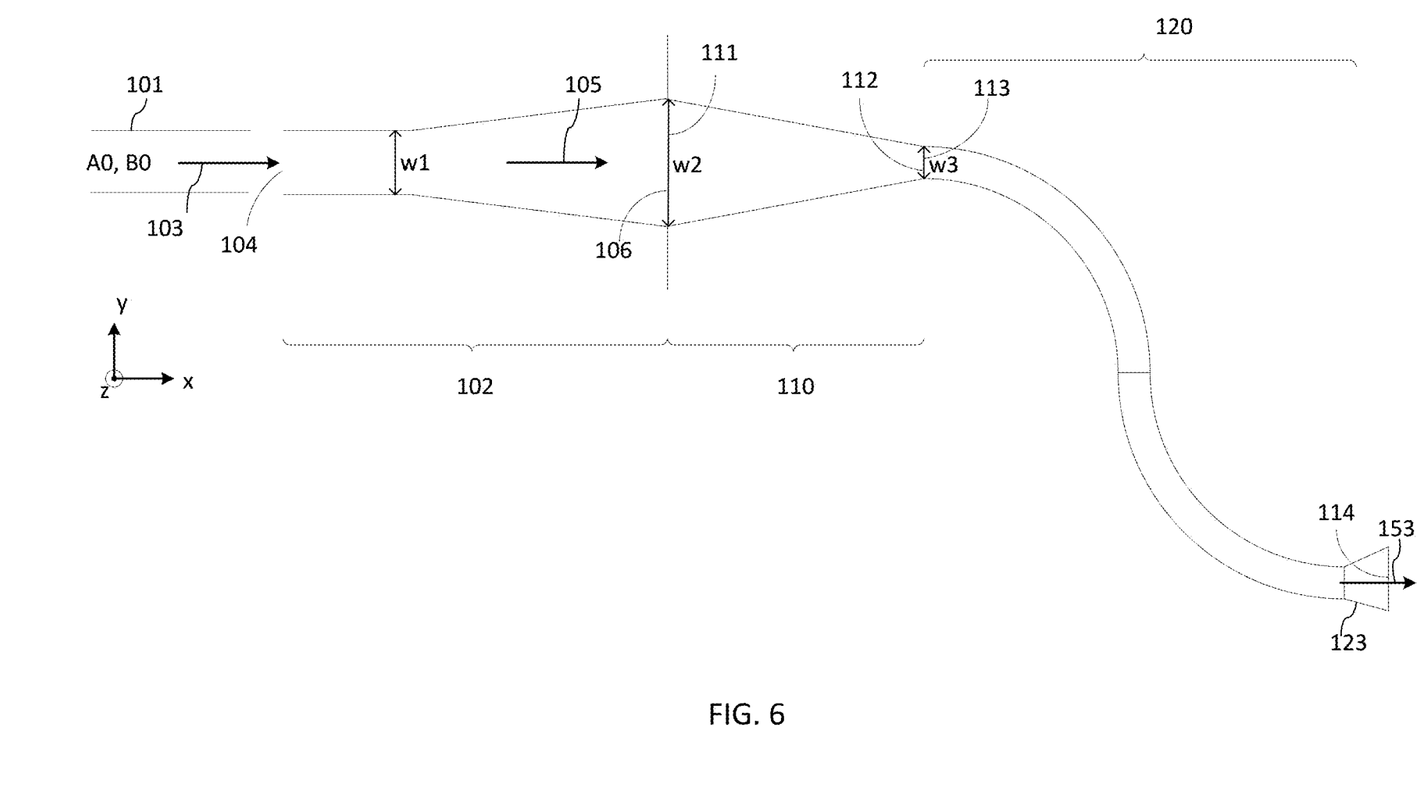
FIG. 6 is a schematic plan-view diagram of an embodiment of the polarizer of FIG. 1 with an S-bend in the dump waveguide and an output taper.

With reference to FIG. 6, it is noted that the exact shape of the dump waveguide 120, for example the number and shape of waveguide bends it includes and the direction in which it guides the output light, may vary in different embodiments. For example the dump waveguide 120 may include an S-bend as illustrated in FIG. 6, which may be helpful if it is desirable to direct the output light in the same general direction as the received light 103. Furthermore in some embodiments, for example wherein the output width W3 of the mode squeezing waveguide 110 is smaller than the input width of the polarizer W1 and/or smaller than the width of a subsequent waveguide (not shown) into which the output light 153 from the polarizer 100 is to be coupled, an output taper 123 may further be provided at the end of the dump waveguide 120 so as to provide an adiabatic or nearly adiabatic transition between the dump waveguide 120 and the subsequent waveguide.

Figure 7:
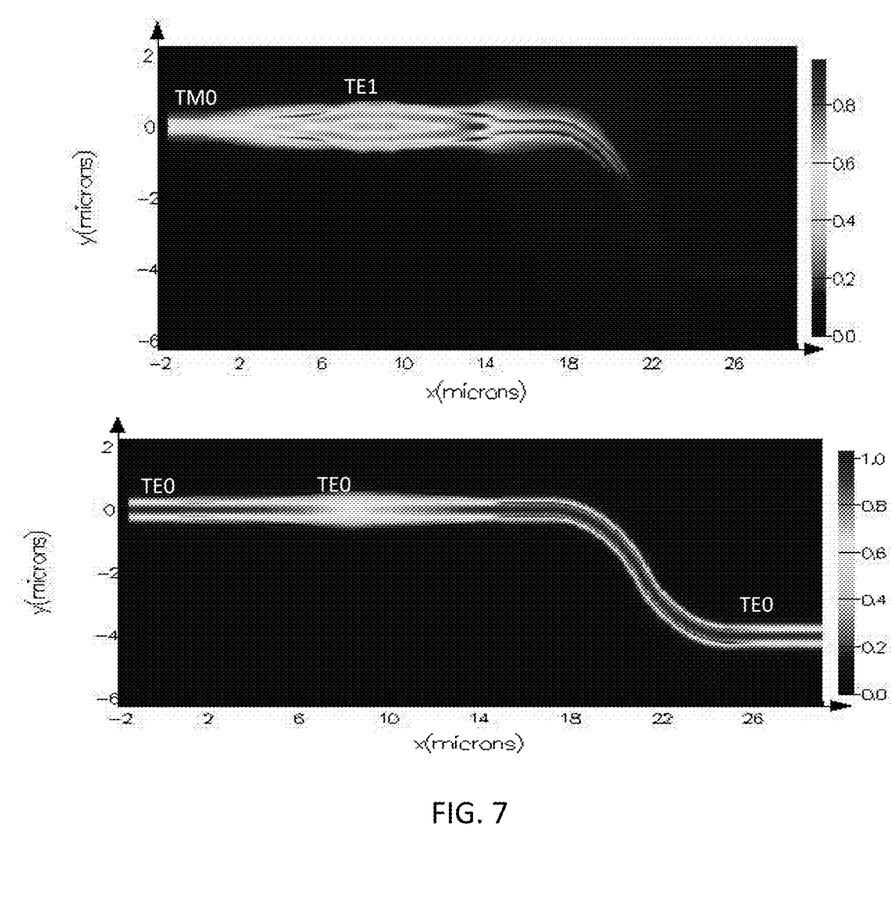
FIG. 7 is a graph showing simulated contour plots of the magnitude of the optical E-field within the waveguide polarizer as illustrated in FIG. 6 with input light in TM0 mode (top panel) and with input light in TE0 mode (lower panel) for an example waveguide polarizer of FIG. 6.

With reference to FIG. 7, there are illustrated simulation results for the evolution of the E-field of an input TM0 light (top panel) and of an input TE0 light (bottom panel) along an example waveguide polarizer 100 of the type illustrated in FIG. 5 formed of a bi-level mode converting waveguide 102 of length 9 μm, a single-layer mode squeezing waveguide 110 of length 7 μm, and the dump waveguide 120 with an S-bend, all defined in a 220 nm thick silicon layer of a SOI wafer with the following parameters as introduced hereinabove: operating wavelength $\lambda$=1550 nm, h1=0.22 μm, h2=0.4·h1, W1=0.5 μm, W2=1.25 μm, W3=0.4 μm, and $R_{bend}$=5 μm. As can be seen from the top panel of the figure, light that enters the mode-converting waveguide in the TM0 mode, which E-field profile is substantially uniform in the transverse to the waveguide direction, i.e. in the direction of the y axis in FIGS. 1, 5 and 6, is converted into a TE1 mode along the length of the mode converting taper, which is then scattered by the mode squeezer, and almost completely eliminated from the waveguide after the first turn of the S-bend of the dump waveguide. However, although the TE0 mode size expands or shrinks to some degree along the waveguide polarizer in accordance with changes in the waveguide width, its optical power is preserved along the whole length of the waveguide polarizer with no visible loss, as can be seen from the lower panel of the figure.

Figure 8A:
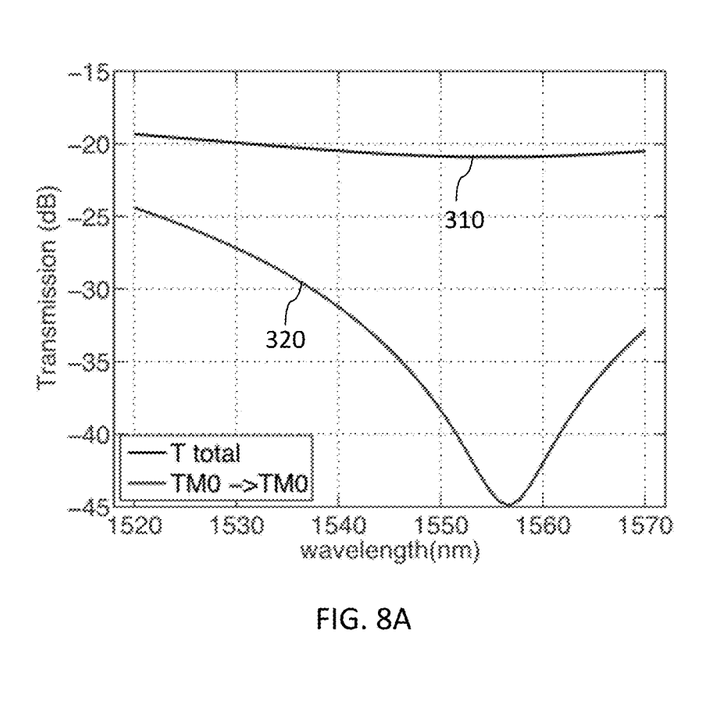
FIG. 8A is a graph that illustrates simulation results for the wavelength dependence of the total output power normalized to an input optical power (top curve) and of the input-normalized output power in the TM0 mode (bottom curve) with input light in TM0 mode for the example waveguide polarizer of FIG. 6.
Figure 8B:
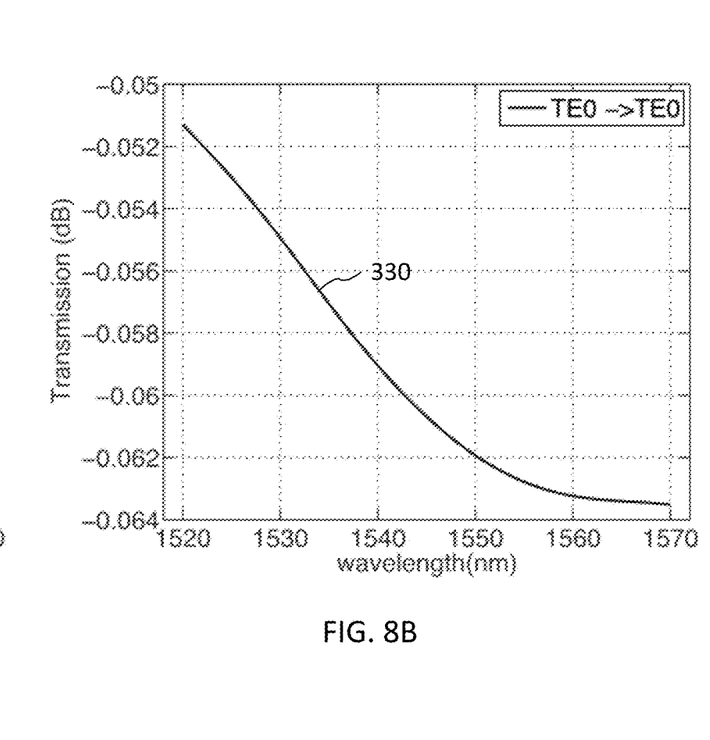
FIG. 8B is a graph that illustrates the wavelength dependence of the TE0 loss in the example waveguide polarizer of FIG. 6.

Turning now to FIGS. 8A and 8B, there are shown results of computer simulations of the wavelength dependence of the polarizer input-output transfer characteristic with the input light 103 in the TM0 mode (FIG. 8A) and with the input light 103 in the TE0 mode (FIG. 8B) for an example waveguide polarizer as illustrated in FIG. 6, with waveguide parameters as described hereinabove with reference to FIG. 7. Curve 310 in FIG. 8A shows the input-normalized total output optical power from the polarizer in all modes, T_total, at TM0 input. T_total, which accounts for light that reaches the output end 114 of the polarizer in all modes when input is in the TM0 mode, is about −20 dB across the C-band relative to the optical power at the polarizer input. Curve 320 in FIG. 8A shows the TM0 component of the output optical power of the polarizer at TM0 input, which is considerably smaller, <−25 dB across the C-band and reaches a minimum of ~−45 dB at $\lambda$~1556 nm. Thus, the TM0 loss in the polarizer varies as a function of wavelength and can be as high as 45 dB. The difference between the two curves 310, 320 is believed to be due to an incomplete TM0 mode conversion in the mode converting waveguide 102 and/or an incomplete dumping of the mode-converted light, such as that in TE1 mode, in the dump waveguide 120. Curve 330 in FIG. 8B shows simulation results for the loss of TE0 mode in the waveguide polarizer, which is quite low, <0.06 dB. The mode extinction ratio, as defined by the difference between total received power at TE0 input in dB, i.e., the TE0 loss 330, and the total received power at TM0 input in dB, i.e., T_total 310, is about 20 dB.

It will be appreciated that principles and approaches described hereinabove with reference to the example embodiments, and in particular with reference to converting, squeezing out, and dumping a TM0 mode of input light while allowing light of a TE0 mode to propagate, may also be applicable to filtering out other undesired modes while preserving a desired mode or modes, by first converting them into a higher-order mode of a smaller effective index than that of a desired mode, and then squeezing out and dumping the higher order mode.

Accordingly, one aspect of the present disclosure relates to a method of mode filtering in a PIC comprising an optical waveguide supporting first and second modes, where the method includes the following steps or operations:

a) receiving light from an input optical waveguide supporting first and second modes into a mode converting waveguide;

b) using the mode converting waveguide to selectively convert light received in the second mode into a third mode while maintaining light received in the first mode to remain in the first mode;
c) using a mode squeezing waveguide to at least partially squeeze out the third mode so as to lessen an optical confinement thereof within the mode squeezing waveguide to a greater degree than the optical confinement of the first mode; and,
d) selectively attenuating the third mode using a dump waveguide configured to dump light of the third mode received from the mode squeezing waveguide while allowing light in the first mode to propagate to an output.

In one embodiment of the method, the first mode may be a highest effective index mode of the input waveguide, and the second mode may be any other mode having a lower effective than that of the first more. In one embodiment, the first mode may be a TE mode, the second mode may be a TM mode, and the third mode may be a TE mode of a higher order than that of the first mode. For example, the first mode may be TE0, the second mode may be TM0, and the third mode may be TE1 or TE3. In one embodiment, the first mode may be a TM0 mode, the second mode may be a TE0 mode, and the third mode may be a TMn mode of a higher order or a TEn mode of a higher order. In one embodiment, the first mode may be a highest effective index mode of the input waveguide, for example the TE0 mode, and the second mode may be a mode having a second highest effective, for example the TM0 mode, which is converted in a mode having a third highest effective index, such as TE1, that is subsequently dumped by the dump waveguide 120 as described hereinabove with reference to FIG. 1 and FIGS. 5-8B. Note that in such embodiment the integrated waveguide polarizer 100 described hereinabove operates substantially as a mode filter that is configured to block all modes other than the highest-index one, since the dump waveguide that is configured to eliminate TE1 mode will also eliminate all higher-order TE and TM modes that pass the mode converting and mode squeezing waveguides 102, 120.

Embodiments described hereinabove provide an integrated on-chip polarizer that may be fabricated for example in silicon or other layer of a SOI wafer, in a way that is compatible with a CMOS fabrication process. Advantageously, such a polarizer may have ultralow loss for a desired mode, e.g. on the order or less than 0.1 dB for a TE0 mode, and a high extinction ratio, e.g. in excess of 20 dB for the undesired mode, such as the TM0 mode. Furthermore, optical polarizers or mode filters constructed using principles and methods described herein may be used to filter and or polarized light with wavelengths lying in various wavelength ranges, including but not limited to the telecommunication wavelength ranges known as the O-band, E band, S band C band, L band, and U band, which together span from about 1260 nm to about 1675 nm.

Low-loss high-efficiency waveguide polarizers that can be integrated within a PIC, including but not limited to those described hereinabove, may be advantageously used to suppress spectral and intensity noise that is associated with polarization cross-coupling and/or mode cross-coupling in a PIC, such as for example due to mode scattering on waveguide irregularities that may be occurring within long optical waveguide interconnects. For example, the waveguide on-chip polarizer 100 may be incorporated in a PIC in conjunction with an integrated optical device such as a photo-detector, an optical modulator, an Echelle grating, an MMI coupler, a routing waveguide, an integrated laser source, etc.

For example, polarizer 100 may be disposed at an input port of an integrated photodetector, modulator, MMI coupler, or Echelle grating, so as to filter out an undesired mode or modes, e.g. the TM0 mode and/or higher-order TE and TM modes. Similarly, it may be incorporated at the output of an integrated laser source, MMI coupler, or Echelle grating. In some embodiments, one or more waveguide polarizers may be inserted along the length of a long waveguide interconnect in a PIC. In some PIC embodiments, long waveguide interconnects may be required to route light between two optical waveguides or ports that are comparatively far from each other in the PIC. In some cases such waveguide interconnects may be made relatively wider and multimode in order to reduce optical loss. In many cases, such waveguides are fed substantially with TE polarized light, so that most if not all of the light may be concentrated in the TE0 mode at the input. However, scattering on waveguide non-idealities may lead to mode and polarization conversion in such waveguides, when some of the TE0 light gets scattered into other modes, causing polarization or mode cross-coupling that may lead to undesirable noise at the receiving device. In the context of this specification, the terms "polarization cross-coupling" and "polarization cross-talk" are used interchangeably to mean transfer of light energy between two different polarizations of light, typically between TE and TM polarizations, which may happen in a non-ideal waveguides. The terms "mode cross-coupling" and "mode cross-talk" are used interchangeably to mean transfer of light energy between two different waveguide modes due to waveguide non-idealities. It will be appreciated that the polarization cross-coupling or cross-talk in an optical waveguide is a particular case of the mode cross-coupling or cross-talk which happens between TE and TM modes.

Figure 9:
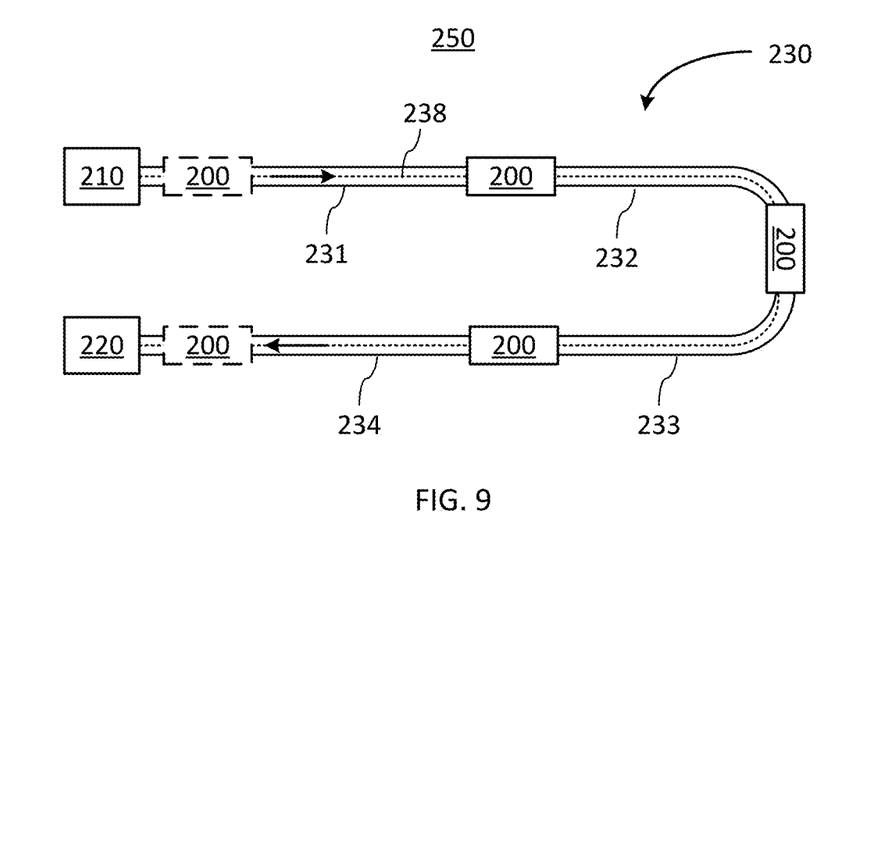
FIG. 9 is schematic plan-view diagrams of a photonic integrated circuit with an optical waveguide interconnect incorporating integrated waveguide polarizers or mode filters for suppressing signal noise due to polarization mode cross-coupling.

Referring to FIG. 9, there is illustrated a PIC 250 including an optical waveguide interconnect (OWI) 230 that is configured to provide an optical connection between a first optical device 210 and a second optical device 220. The first optical device 210 may be, for example, an integrated laser source, a waveguide modulator, a waveguide coupler, or any other optical device configured to transmit an optical signal and which may be integrated in a PIC chip. The second optical device 220 may be, for example, a photodetector, a waveguide modulator, a waveguide coupler, or any other optical device configured to receive an optical signal and which may be integrated in a PIC chip. In one embodiment, one or both of the first and second optical devices 210, 220 may be in the form of an optical port for coupling to an external chip or device. The OWI 230 includes one or more integrated waveguide polarizers 200, each of which configured to suppress light propagating in the optical waveguide interconnect in an undersized polarization mode, for example TM0, so as to reduce mode and/or polarization crosstalk downstream from the integrated waveguide polarizers 200. In one embodiment the polarizers 200 may be inserted within OWI 230 at regular intervals so as to avoid long lengths of routing waveguides without a polarizer. Waveguide polarizers may be for example in the form of the waveguide polarizer 100 described hereinabove with reference to FIGS. 1-6 but may also be different waveguide polarizers that are configured to strip light passing therethrough form an undesired mode or modes, such as for example TM0 mode and higher-order TEn modes. Although five polarizers 200 are shown in FIG. 8, it will be appreciated that in other embodiments fewer or greater number of polarizers may be used, in dependence upon the total length of the waveguide interconnect and PIC design considerations. Thus, in one embodiment OWI 230 may be in the form of, or include, a chain of two or more polarizers 200 directly connected to each other in series by routing waveguides, such as waveguide sections 231, 232, 233, and 234 illustrated in FIG. 8. Polarizers 200 that are disposed in the routing path 238 of the OWI 250 next to the optical devices 210, 220 and indicated in the figure by dashed blocks may be employed to clean-up the optical signal from undesired mode or modes as it is being transmitted by the first optical device 210 or received by the second optical device 220; these polarizers may be omitted in some embodiments depending on the optical devices used and system design tolerances.

The placement of the polarizers within the PIC 250 may be determined at the stage of the PIC design in accordance with a pre-defined rule or an algorithm, for example so as to ensure the absence of polarizer-free routing links in the PIC that are longer than a pre-defined maximum length Lmax. The exact value of Lmax may vary in dependence upon particular PIC requirements, parameters of the routing waveguides, presence of other integrated optical devices in the link, etc. It may be determined, for example, so as to ensure that the mode and/or polarization extinction ratio ER of an optical signal stays below a pre-defined maximum value ERmax as the optical signal propagates in the PIC, so as to reduce signal noise due to mode and/or polarization cross-coupling to a system-acceptable level. Such a rule or a set of rules may be incorporated in PIC layout software so as to provide an automatic placement of optical polarizers in a PIC at the stage of the PIC layout design.

Accordingly, an example method of designing a photonic integrated circuit (PIC) chip may include the following steps: a) determining a routing path in the PIC chip for an optical waveguide interconnect that is configured for routing optical signals between optical elements; and b) disposing one or more waveguide polarizers along the routing path so that a maximum length of a contiguous section of the optical waveguide interconnect without a waveguide polarizer does not exceed the predefined maximum length Lmax. In the example embodiment of FIG. 8, the 'routing path' is designated by a dotted line 238 and is the path defined by the waveguides 231-234.

In one embodiment the maximum length Lmax may be determined in dependence upon one or more waveguide parameters, such as for example waveguide width. In one embodiment, steps a) and b) may be performed automatically using a computer executing software instructions for implementing said steps. Techniques and approaches for incorporating corresponding polarizer placement rules as software instructions into existing or newly developed computer programs for PIC layout design will be apparent to those skilled in the art on the basis of the present disclosure.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings. Thus, such other embodiments and modifications are intended to fall within the scope of the present disclosure. For example, it will be appreciated that semiconductor materials other than silicon, including but not limited to compound semiconductor materials of groups commonly referred to as A3B5 and A2B4, such as GaAs, InP, and their alloys and compounds, may be used to fabricate the integrated waveguide polarizers example embodiments of which are described hereinabove. In another example, although example embodiments described hereinabove may have been described primarily with reference to polarizers or mode filters that are configured to block a fundamental TM mode while letting a fundamental TE mode to pass through, it will be appreciated that principles and device configurations described hereinabove with reference to specific examples may be adopted to squeeze out and dump any waveguide mode or group of modes of a lower effective index than a desired waveguide mode that is to be passed through by the polarizer, by suitably configuring the waveguide geometry of the mode converting waveguide 102, mod squeezing waveguide 110, and/or the dump waveguide 120. For example, embodiments may be envisioned wherein a TM0 mode enters the polarizer with a lower effective index than the TE0 mode, for example depending on the geometry of the input waveguide, in which case the first, or desired, mode B0 may be the TM0 mode, the second, or undesired, mode A0 may be the TE0 mode, and the third mode A1 may be a higher-order TM or TE mode. Furthermore, although in the example embodiments described hereinabove the dump waveguide included a waveguide bend which radius is selected to dump the third mode A1 by leaking into the cladding, in other embodiments the dump waveguide may be a straight or less-bent waveguide that is configured to selectively attenuate light in the third mode by other means, such as using light absorbing layers or cladding regions disposed at some distance from the waveguide core of a bi-level rib waveguide that is selected so as to attenuate the less-confined third mode but not the first mode.

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. An optical polarizer configured to suppress light in a second mode while passing through light in a first mode, comprising:
   a first tapered waveguide including a width that widens from a first width to a second width in a direction of light propagation for converting the second mode to a third mode with a lower effective refractive index than the first mode;
   a second tapered waveguide that narrows from the second width to a third width for squeezing the third mode out thereof; and a bend waveguide section for substantially eliminating the third mode therefrom, while preserving the first mode.

2. The optical polarizer according to claim 1, wherein the first mode is a TE mode and the second mode is a TM mode.

3. The optical polarizer according to claim 2, wherein the first mode is a fundamental TE mode.

4. The optical polarizer according to claim 1, wherein the first mode is a fundamental TE mode and the second mode is a higher-order TE mode.

5. The optical polarizer according to claim 1, wherein the first tapered waveguide comprises a mode converter that widens in the direction of light propagation.

6. The optical polarizer according to claim 5, wherein the first tapered waveguide widens non-linearly with length.

7. The optical polarizer according to claim 5, wherein the first tapered waveguide is vertically asymmetric.

8. The optical polarizer according to claim 5, wherein the first tapered waveguide comprises a bi-level rib waveguide.

9. The optical polarizer according to claim 5, wherein the first tapered waveguide includes a lower cladding comprising a first refractive index, and an upper cladding comprising a second refractive index different than the first refractive index.

10. The optical polarizer according to claim 1, wherein the second tapered waveguide comprises a mode squeezer including a width that narrows in the direction of light propagation.

11. The optical polarizer according to claim 10, wherein the second tapered waveguide narrows non-linearly with length.

12. The optical polarizer according to claim 10, wherein the second tapered waveguide includes a bi-level section.

13. The optical polarizer according to claim 12, wherein the second tapered waveguide includes a ridge waveguide section.

14. The optical polarizer according to claim 10, wherein the second tapered waveguide comprises a ridge waveguide.

15. The optical polarizer according to claim 1, wherein the third width is smaller than the second width.

16. The optical polarizer according to claim 15, wherein the bend waveguide section includes an output taper to provide an adiabatic transition between the bend waveguide section and a subsequent waveguide.

17. The optical polarizer according to claim 1, wherein the bend waveguide section comprises a dump waveguide capable of dumping the third mode while guiding the first mode therethrough.

18. The optical polarizer according to claim 1, wherein the bend waveguide section includes a bend with a bend radius, whereby the second and third modes lose coupling and are dumped from the bend waveguide section, while the first mode is guided therethrough.

19. The optical polarizer according to claim 18, wherein the bend waveguide section comprises an S-bend including first and second turns.

20. The optical polarizer according to claim 1, wherein the bend waveguide section comprises a dump waveguide capable of guiding the first mode with a highest effective index therethrough, and dump all modes other than the first mode with lower effective indexes.

* * * * *